US009362696B1

(12) United States Patent
Black et al.

(10) Patent No.: US 9,362,696 B1
(45) **Date of Patent: *Jun. 7, 2016**

(54) PORTABLE APPARATUS HAVING ELECTRICAL POWER RECEPTACLES AND DEVICE CHARGING PORTS

(71) Applicant: Premier Manufacturing Group, Inc., Shelton, CT (US)

(72) Inventors: David Black, Orange, CT (US); Michael O'Keefe, Wethersfield, CT (US); Kimberly Golden, Wallingford, CT (US); Michael Brandstatter, Ansonia, CT (US)

(73) Assignee: Premier Manufacturing Group, Inc., Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/793,187

(22) Filed: Jul. 7, 2015

Related U.S. Application Data

(63) Continuation of application No. 13/728,055, filed on Dec. 27, 2012, now Pat. No. 9,088,088.

(51) Int. Cl.

| | |
|---|---|
| ***H05K 7/02*** | (2006.01) |
| ***H01R 27/02*** | (2006.01) |
| ***H01R 13/46*** | (2006.01) |
| *H02J 7/00* | (2006.01) |
| *A47B 21/06* | (2006.01) |

(52) U.S. Cl.
CPC ................ *H01R 27/02* (2013.01); *H01R 13/46* (2013.01); *A47B 21/06* (2013.01); *A47B 2021/066* (2013.01); *A47B 2200/0023* (2013.01); *A47B 2200/0081* (2013.01); *A47B 2200/0082* (2013.01); *H02J 7/0027* (2013.01)

(58) Field of Classification Search
CPC ........... A47B 21/06; A47B 2200/0023; A47B 2200/0081; A47B 2200/0082; A47B 2021/066; H02J 7/0027
USPC .......... 361/638, 654, 826, 807–810; 439/652, 439/654; 248/163.1, 431
See application file for complete search history.

(56) References Cited

U.S. PATENT DOCUMENTS

| | | | | |
|---|---|---|---|---|
| 5,133,234 | A * | 7/1992 | Ehlert ................... | B09B 3/0058 30/101 |
| 6,875,051 | B2 * | 4/2005 | Pizak ..................... | H01R 27/02 439/501 |
| 7,296,775 | B2 * | 11/2007 | Mayer .................. | H01R 25/006 211/163 |
| 2009/0295328 | A1 * | 12/2009 | Griffin, Jr. ............ | H02J 7/0044 320/115 |

* cited by examiner

*Primary Examiner* — Hoa C Nguyen
*Assistant Examiner* — James Wu
(74) *Attorney, Agent, or Firm* — Raymond A. Nuzzo

(57) ABSTRACT

A portable apparatus that provides electrical power receptacles and device charging ports. The portable apparatus has a base member and a plurality of post members connected to the base member. Each post member has an electrical power receptacle that provides electrical power and an electrical power device having a device charging port that provides a voltage suitable for charging and powering devices such as cell phones, cameras, iPads, Ipods and similar devices. In a preferred embodiment, the electrical power device includes an additional electrical power receptacle. Each post member has an interior region and electrical wiring located with the interior region which provides electrical power to the electrical power receptacles and the electrical power device. The portable apparatus also has a top member connected to the post members and an intermediate support member that is attached to the post members and located between the top member and the base member.

16 Claims, 7 Drawing Sheets

PORTABLE APPARATUS HAVING ELECTRICAL POWER RECEPTACLES AND DEVICE CHARGING PORTS

CROSS REFERENCE TO OTHER PATENT APPLICATIONS

This application is a continuation of U.S. application Ser. No. 13/728,055, filed Dec. 27, 2012. U.S. application Ser. No. 13/728,055 and the entire disclosure thereof are hereby incorporated by reference into this present application.

STATEMENT OF GOVERNMENT INTEREST

None.

BACKGROUND OF THE INVENTION (1) Field of the Invention

The present invention relates to a portable apparatus for providing electrical power receptacles and device charging ports.

(2) Description of the Prior Art

Apparatuses and devices that provide electrical power receptacles are known in the art. Examples of such apparatuses and devices are disclosed in U.S. Pat. Nos. Des. 372,018, Des. 389,459, 6,042,426 and 7,760,516.

SUMMARY OF THE INVENTION

It is an object of the present invention to provide a portable apparatus that provides electrical power receptacles and device charging ports.

In one aspect, the present invention is directed to a portable apparatus for providing electrical power receptacles and device charging ports. The portable apparatus comprises a base member and a plurality of post members connected to the base member. Each post member comprises at least one electrical power receptacle that provides electrical power and at least one electrical power device that comprises at least one device charging port. The device charging port provides a relatively lower voltage suitable for charging and powering devices such as cell phones, smart phones, digital cameras, iPads, Ipods and similar devices. In a preferred embodiment, the electrical power device also includes an additional electrical power receptacle. Each post member has an interior region and internal electrical wiring located in the interior region. The electrical wiring provides electrical power to the electrical power receptacles and the electrical power device. The portable apparatus also has a top member connected to the plurality of post members and an intermediate support member that is attached to the plurality of post members and located between the top member and the base member.

In another aspect, the present invention is directed to a portable apparatus for providing electrical power, comprising a base member, a plurality of hollow post members connected to the base member, at least one electrical power receptacle on each hollow post member, at least one electrical power device on each hollow post member, wherein each electrical power device comprises at least one device charging port. Electrical conductors or wires are electrically connected to the electrical power receptacle and the electrical power device so as to provide electrical power to the electrical power receptacle and the electrical power device. In a preferred embodiment, the device charging port comprises a USB charging port.

In another aspect, the present invention is directed to a portable apparatus for providing electrical power, comprising a base member, a plurality of hollow post members connected to the base member, and at least one electrical power device on each hollow post member, wherein the electrical power device comprises at least one device charging port. Electrical conductors or wires are electrically connected to each electrical power device so as to provide electrical power to the electrical power devices. In a preferred embodiment, the at least one device charging port comprises a USB charging port.

Other objects and advantages of the present invention will be apparent from the ensuing description, claims and accompanying drawings.

DETAILED DESCRIPTION OF THE INVENTION

Figure 1:
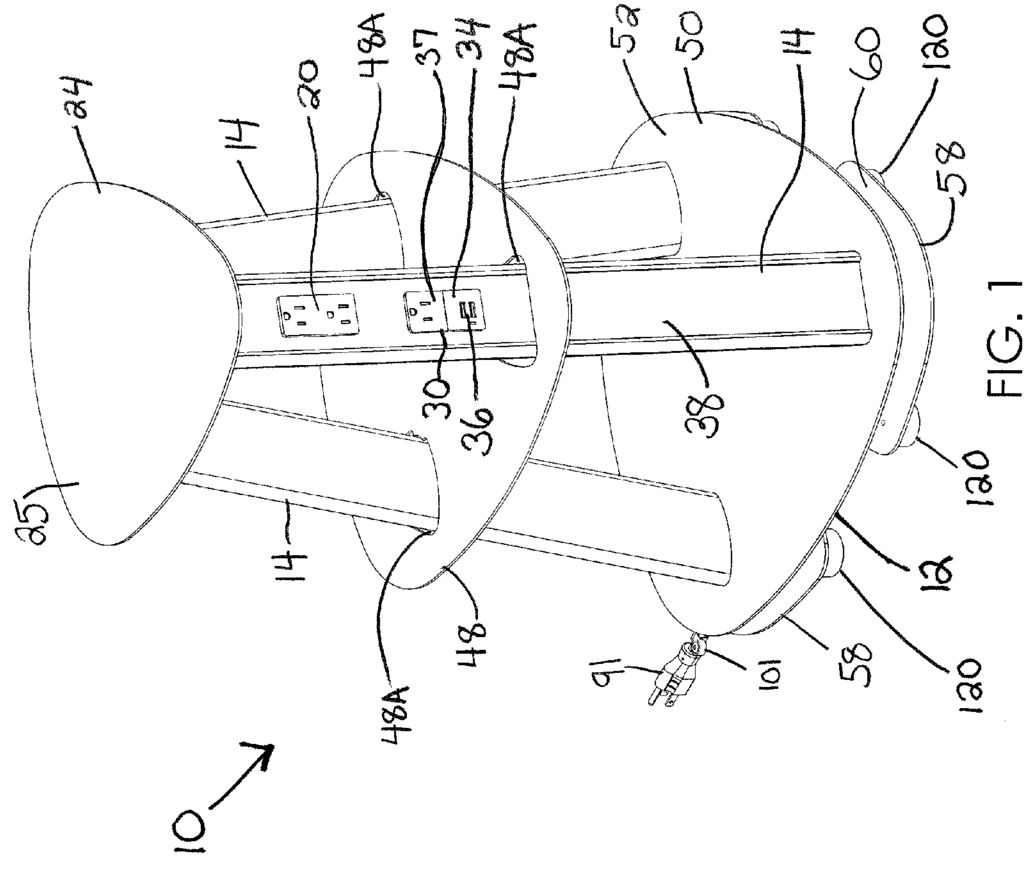
FIG. 1 is a perspective view of the portable apparatus for providing electrical power in accordance with one embodiment of the present invention.

Referring to FIGS. 1-3 and 7, there is shown portable apparatus 10 for providing electrical power in accordance with one embodiment of the invention. Portable apparatus 10 comprises base member 12 and a plurality of post members 14 attached to base member 12. Each post member 14 comprises an interior region 16 that extends throughout post member 14. Each post member 14 further includes at least one electrical power receptacle 20, and electrically conductive members or wires that are located within interior region 16 and electrically connected to the electrical power receptacle 20 (see FIG. 7). These electrically conductive members or wires are described in detail in the ensuing description. In a preferred embodiment, electrical power receptacles 20 are configured to provide 110-120 VAC. However, it to be understood that electrical power receptacles 20 may be configured to provide other voltages as well. In a preferred embodiment, each post member 14 has a plurality of electrical power receptacles 20. In a further embodiment, each post member 14 has only one electrical power receptacle 20. In another embodiment, only one post member 14 has an electrical power receptacle 20. In a preferred embodiment, each electrical power receptacle 20 is a tamper-resistant electrical power receptacle. In one embodiment, each electrical power receptacle 20 is configured as a tamper-resistant electrical power receptacle manufactured by Cooper Wiring Devices of Peachtree City, Ga.

In a preferred embodiment, post members 14 are equidistantly spaced. In a preferred embodiment, apparatus 10 comprises three post members 14. In another embodiment, there are more than three post members 14. In a further embodiment, there are just two post members 14. In a preferred embodiment, each post member 14 is angulated with respect to base member 12 in accordance with a predetermined angulation so that post members 14 are angulated inward toward each other (see FIGS. 1 and 2). In a preferred embodiment, the degree of angulation with respect to base member 12 is between about 5° and 25°. In a preferred embodiment, base member 12 and each post member 14 are fabricated from metal, e.g. steel, aluminum, iron, etc. However, other suitable materials may be used, e.g. plastic, resin, etc.

Figure 2:
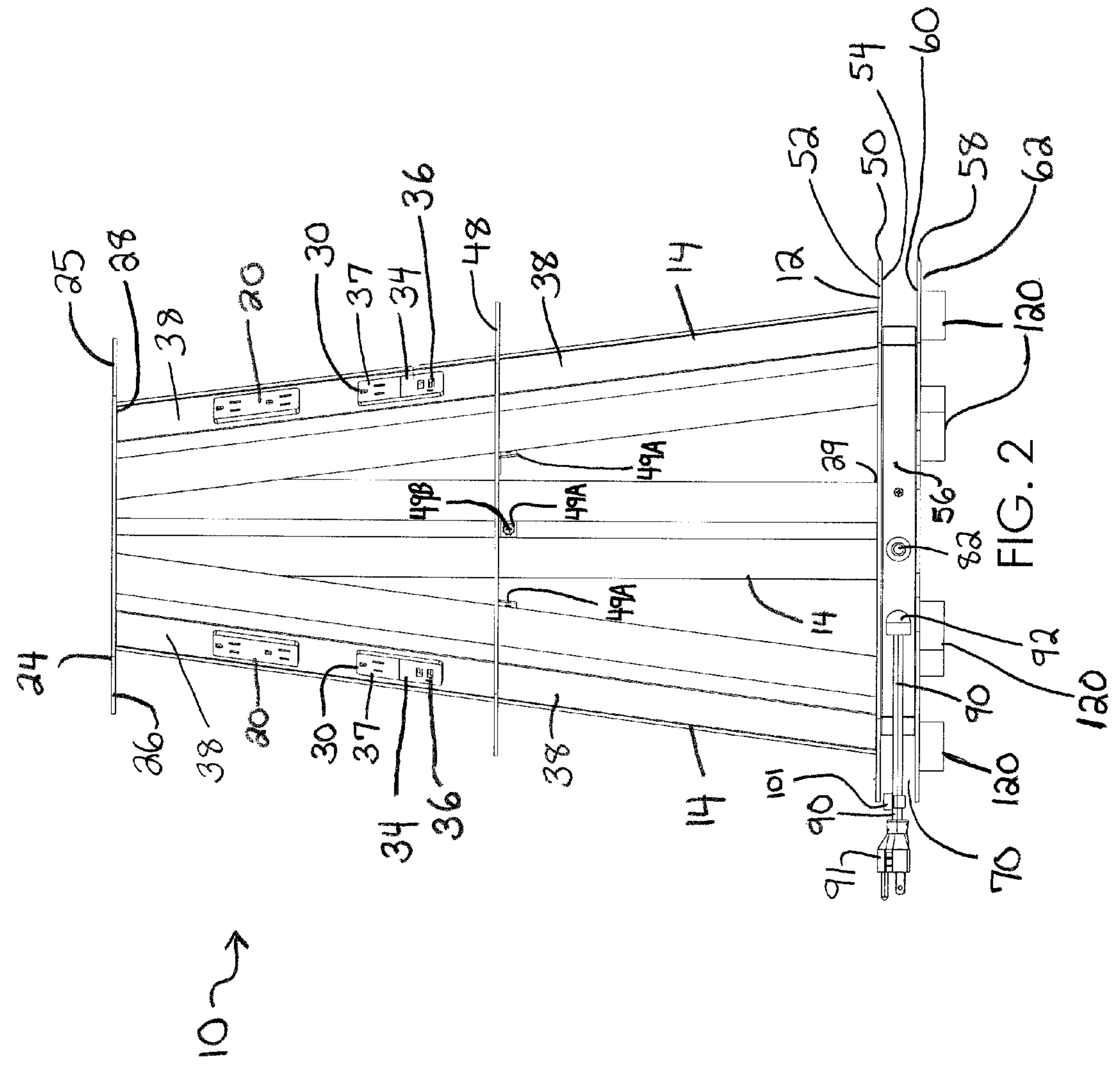
FIG. 2 is a side view, in elevation, of the portable apparatus of FIG. 1.
Figure 3:
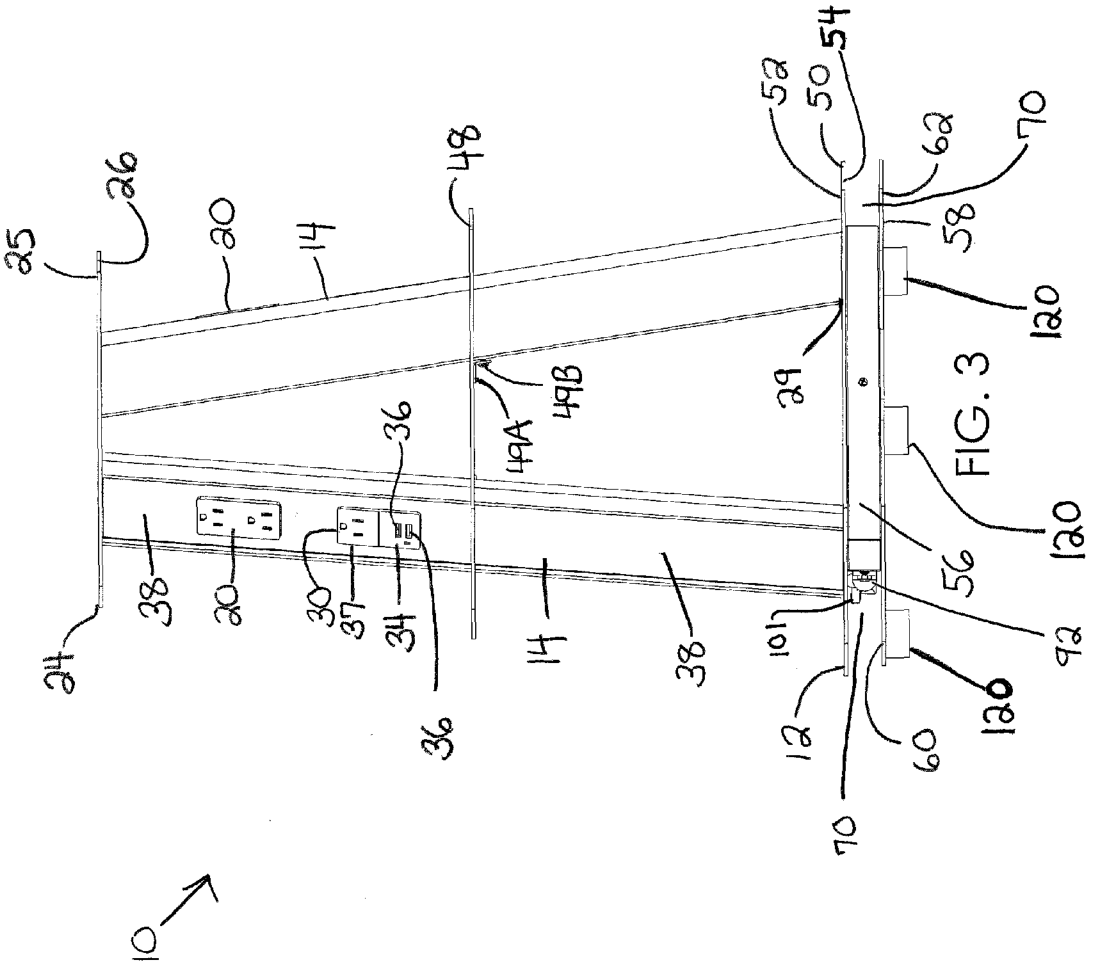
FIG. 3 is another side view of the portable apparatus of FIG. 1.
Figure 4:
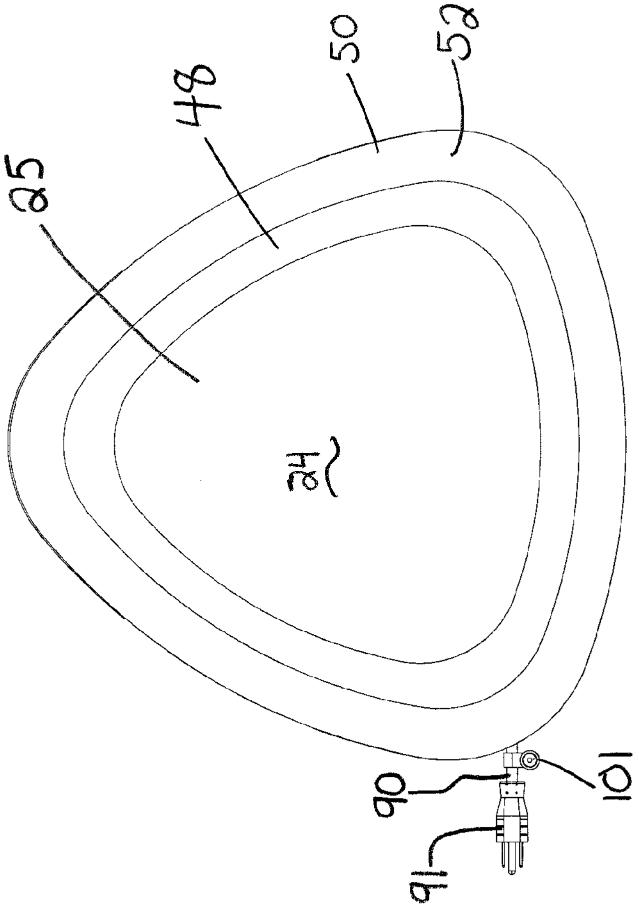
FIG. 4 is a top view of the portable apparatus of FIG. 1.

As shown in FIGS. 1-3 and 7, apparatus 10 further comprises a top member 24. Top member 24 comprises a plate member that has top side 25 and bottom side 26. Top end 28 of each post member 14 is attached to bottom side 26 of the aforementioned plate member. Top side 25 and bottom side 26 are substantially flat. Each post member 14 includes a bottom end 29 that is attached to base member 12 (see FIGS. 2 and 3). As shown in FIGS. 1-3, top member 24 is substantially parallel to base member 12. In a preferred embodiment, top member 24 is fabricated from metal, e.g. steel, aluminum, etc. However, other suitable materials may be used to fabricate top member 24, such as plastic, resin, rubber, etc. Base member 12 is discussed in detail in the ensuing description.

Referring to FIGS. 1-3 and 7, each post member 14 further comprises electrical power device 30 that comprises at least one charging device 34. Charging device 34 comprises power conversion circuitry that converts 115-120 VAC to a relatively lower voltage that can be used to charge and power devices such as cell phones, smart phones, tablets, e-readers, digital recorders, cameras, iPads, iPods, MP3 players, etc. Charging device 34 comprises at least one device charging port 36. In one embodiment, charging device 34 comprises two device charging ports 36. In another embodiment, charging device 34 comprises more than two device charging ports 36. The device to be charged, e.g. smart phone, is plugged into a device charging port 36. In a preferred embodiment, each device charging port 36 comprises a USB charging port. In one embodiment, electrical power device 30 is configured so that each USB charging port 36 provides 5 VAC @ 700 mA (milliamperes). However, it is to be understood that electrical power device 30 can be configured to provide other voltage levels and currents. For example, in an alternate embodiment, electrical power device 30 is configured so that the USB charging port 36 provides 5 VAC @ 500 mA. In a preferred embodiment, electrical power device 30 comprises an additional electrical power receptacle 37 that also provides 115-120 VAC. In one embodiment, electrical power device 30 is a commercially available model no. TR7740-W USB charger with a tamper-resistant receptacle, manufactured by Cooper Wiring Devices of Peachtree City, Ga.

In a preferred embodiment, each post member 14 has a face portion 38 that is substantially flat and faces outward. Each electrical power receptacle 20 is located in face portion 38. Similarly, each electrical power device 30 is in face portion 38. Specifically, each face portion 38 has one or more openings formed therein which are sized to receive electrical power receptacles 20 and electrical power devices 30. In one embodiment, electrical power receptacles 20 and electrical power devices 30 are frictionally fitted within the corresponding openings in face portion 38. In an alternate embodiment, only one post member 14 has a face portion 38. In a further embodiment, only two post members 14 have face portions 38.

Figure 7:
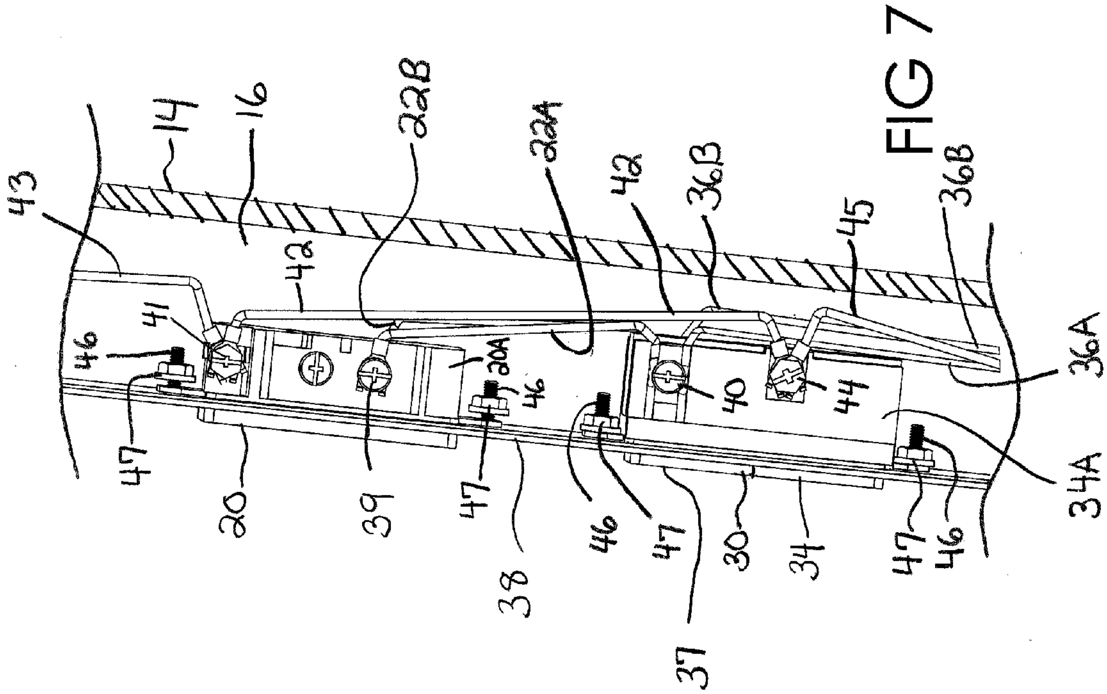
FIG. 7 is a sectional, side view, in cross-section and elevation, of a post member shown in FIGS. 1-3.

As shown in FIG. 7, each electrical power receptacle 20 has portion 20A that extends into interior region 16 of post member 14. Portion 20A has electrical contact 39 for the connection of "hot" electrical wire 22A. Portion 20A also has an electrical contact (not shown) for the connection of neutral electrical wire 22B. Similarly, each electrical power device 30 has portion 34A that extends into interior region 16 of post member 14. Portion 34A includes electrical contacts 40 for the connection of "hot" electrical wires 22A and 36A. Neutral electrical wire 22B is also electrically connected to an electrical contact (not shown) on electrical power device 30. Neutral electrical wire 36B is connected to the same electrical contact (not shown) on electrical power device 30 to which neutral electrical wire 22B is connected. The electrical power receptacle 20 and electrical power device 30 are connected in parallel. Electrical wires 36A and 36B provide electrical power to electrical power device 30. Electrical power device 30 includes internal wiring that provides this electrical power to charging device 34 and electrical power receptacle 37. Electrical power receptacle 20 also includes electrical contact 41. Ground wires 42 and 43 are connected to electrical contact 41. Ground wire 43 is also connected to post member 14 via a connector, or a screw and nut combination, or any other suitable technique. Electrical power device 30 includes electrical contact 44. Ground wires 42 and 45 are connected to electrical contact 44. As shown in FIG. 7, electrical power receptacle 20 and electrical power device 30 are removably attached to post member 14 via screw mounts 46 and nuts 47.

Referring to FIGS. 1-4, apparatus 10 further comprises intermediate support member 48 that is attached to post members 14 and located between base member 12 and top member 24. Intermediate support member 48 is substantially parallel to base member 12 and top member 24. Intermediate support member 48 comprises a plate member that has a plurality of openings 48A therein. Each post member 14 is disposed through a corresponding one of openings 48A. As shown in FIGS. 2 and 3, intermediate support member 48 is attached to post members 14 by "L" shaped brackets 49A and screws 49B. In a preferred embodiment, intermediate member 48 is fabricated from metal, e.g. steel, aluminum, etc. However, other suitable materials may be used to fabricate intermediate member 48, such as plastic, resin, rubber, etc.

Figure 6:
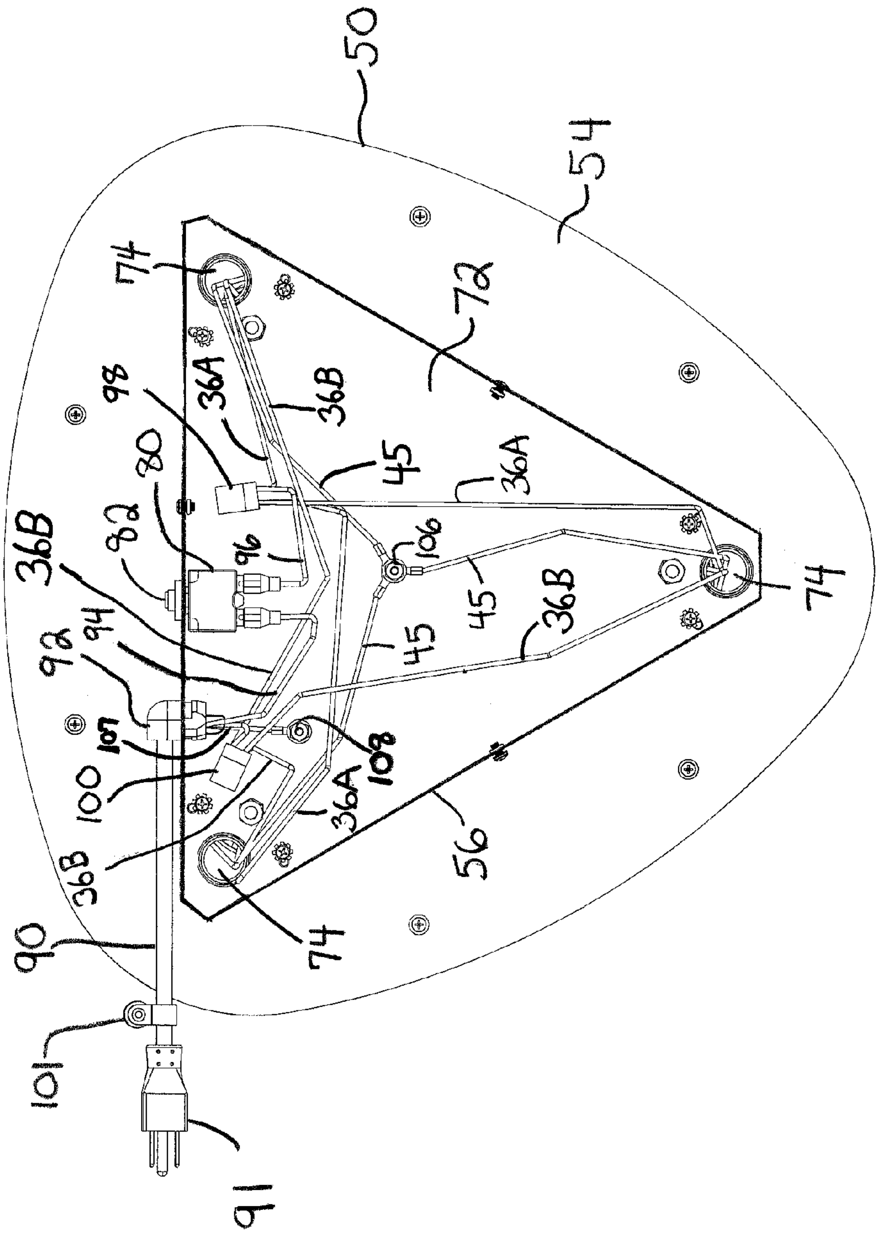
FIG. 6 is a bottom view of the portable apparatus of FIG. 1, the view not showing a lower plate member depicted in FIG. 5 in order to show electrical wiring.

Referring to FIGS. 1-3 and 6, base member 12 comprises upper plate member 50 which has a first perimeter, top side 52 and bottom side 54. Base member 12 further includes wall structure 56 that is attached to bottom side 54 of upper plate member 50. Base member 12 also includes lower plate member 58 which has a second perimeter, a top side 60 and bottom side 62. Wall structure 56 is attached to top side 60 of lower plate member 58 such that wall structure 56 is positioned between upper plate member 50 and lower plate member 58. Any suitable technique may be used to attach wall structure 56 to bottom side 54 of upper plate member 50 and to top side 60 of lower plate member 58. Wall structure 56 has a perimeter that is less than the first perimeter of upper plate member 50, and less than the second perimeter of lower plate member 58 so as to define space 70 between upper plate member 50 and lower plate member 58. Space 70 extends about wall structure 56. As shown in FIG. 6, wall structure 56 defines interior region 72. FIG. 6 is a bottom view of portable apparatus 10 with lower plate member 58 removed so as to facilitate viewing of interior region 72. Upper plate member 50 has openings 74 formed therein wherein each opening 74 is aligned with interior region 16 of a corresponding post member 14. Apparatus 10 includes circuit breaker 80 that is mounted within an opening in wall structure 56 and includes reset switch 82 that is accessible to the user. Electrical power cable 90 is secured to wall structure 56 by strain relief clamp 92. Electrical power cable 90 has plug portion 91 which is configured to be plugged into an external electrical power receptacle (not shown) that provides between 110 and 120 VAC. In one embodiment, electrical power cable 90 is a three-wire, 14-gauge electrical power cable. The "hot" electrical power wire 94 of power cable 90 extends to circuit breaker 80. The "hot" electrical power wire 96 is electrically connected to circuit breaker 80 and electrical connector 98. The "hot" electrical conductive wires 36A (see FIG. 7) within the interior region 16 of each post member 14 extends into interior region 72 and are electrically connected to electrical connector 98. Neutral wires 36B (see FIG. 7) within interior region 16 of each post member 14 extend into interior region 72 and are electrically connected to electrical connector 100. As shown in FIGS. 6 and 7, electrical ground wires 45 extend from each post member 14 into interior region 72 of wall structure and are electrically connected to electrical ground connector 106. Electrical ground connector 106 is conductively connected to upper plate member 50. Electrical power cable 90 includes a grounding wire 107 that is connected to electrical ground connector 108. Electrical ground connector 108 is conductively connected to upper plate member 50.

Referring to FIGS. 2 and 3, space 70 allows electrical power cable 90 to be wrapped around wall structure 56 and remain in space 70. In a preferred embodiment, plug portion 91 of electrical power cable 90 includes magnet 101 attached thereto which can be magnetically attached to either upper plate member 50 or lower plate member 58. Magnet 101 allows plug portion 91 to be conveniently and removably attached to upper plate member 50 or lower plate member 58 to prevent the electrical power cable 90 from becoming unwrapped.

Figure 5:
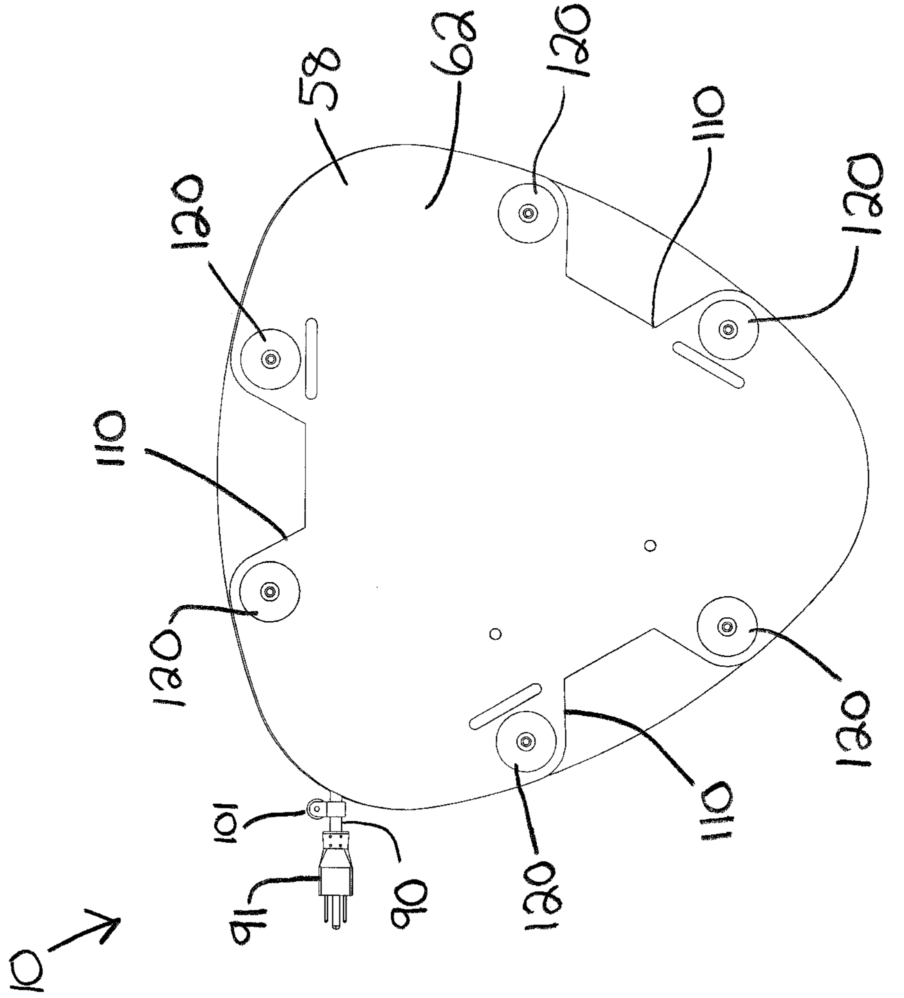
FIG. 5 is a bottom view of the portable apparatus of FIG. 1.

Referring to FIG. 5, lower plate member 58 includes cut-out areas 110 which allow a user to adjust or grasp electrical power cable 90 when electrical power cable 90 is within space 70. Portable apparatus 10 can be configured to have any suitable size. In one embodiment, portable apparatus 10 is configured so that base member 12 has a diameter of eighteen (18) inches, intermediate support member 48 has a diameter of fifteen (15) inches and top member 24 has a diameter of twelve (12) inches. In one embodiment, portable apparatus 10 has a height of twenty-six (26) inches.

Referring to FIGS. 1-3 and 5, apparatus 10 includes a plurality of feet members 120 that are attached to bottom side 62 of lower plate member 58. Feet members 120 are fabricated from any suitable material such as rubber, neoprene rubber, resin, plastic, polyvinylchloride, etc.

In an alternate embodiment, each post member 14 includes at least one data communication port that can be connected to a data communication network. Such a data communication port can be configured as any type of data communication port, including but not limited to, a USB port, Ethernet port, Firewall port, RS-232 connector, an RS-422 connector, HDMI port, and any registered jack including RJ11, RJ14, RJ21, RJ45 and RJ48.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A portable apparatus for providing electrical power, comprising:

a base member having a top side;

a plurality post members attached to and angulated with respect to the base member, wherein each post member has a bottom end that is attached to the top side of the base member, the plurality of post members being angulated inward toward each other, each post member having a top end and an interior region extending between the top end and the bottom end;

at least one electrical power receptacle on at least one of the post members;

electrically conductive members electrically connected to the at least one electrical power receptacle to provide electrical power to the at least one electrical power receptacle, said electrically conductive member being located within the interior region of said at least one post member;

a top member having a top side and a bottom side, the top end of each of the plurality of post members being attached to the bottom side of the top member;

wherein the base member comprises:

an upper plate member having a first perimeter, a top side and a bottom side;

a wall structure attached to the bottom side of the upper plate member; and a lower plate member having a second perimeter, a top side and a bottom side, the wall structure member being attached to the top side of the lower plate member so that the wall structure is between the bottom side of the upper plate member and the top side of the lower plate member, wherein the wall structure defines an interior region and has a perimeter that is less than the first perimeter and the second perimeter so as to define a space that extends about the wall structure, the lower plate member having at least one cut-out area formed in the second perimeter; and a plurality of feet members attached to the bottom side of the lower plate member, wherein the at least one cut-out area comprises a plurality of cut-out areas in the second perimeter and wherein each cut-out area is between a consecutive pair of feet members.

2. The portable apparatus according to claim 1 wherein the at least one electrical power receptacle comprises an AC power receptacle.

3. The portable apparatus according to claim 2 wherein the at least one electrical power receptacle comprises a plurality of AC power receptacles and wherein each post member has at least one AC power receptacle.

4. The portable apparatus according to claim 1 wherein the at least one electrical power receptacle comprises a device charging port.

5. The portable apparatus according to claim 4 wherein the at least one electrical power receptacle comprises an input for receiving a first electrical voltage at a first electrical current and conversion circuitry that converts the first voltage to a second voltage at a second electrical current, wherein the second electrical voltage and second electrical current is less than the first electrical voltage and the first electrical current, respectively.

6. The portable apparatus according to claim 1 wherein the plurality of post members are equidistantly spaced.

7. The portable apparatus according to claim 1 wherein the plurality of post members comprise three post members.

8. The portable apparatus according to claim 1 wherein the top member is substantially parallel to the base member.

9. The portable apparatus according to claim 1 further comprising an intermediate support member attached to the post members and located between the top member and base member.

10. The portable apparatus according to claim 9 wherein the intermediate member comprises a plate member having a plurality of openings, wherein each post member extends through a corresponding opening in the plate member.

11. The portable apparatus according to claim 10 wherein the intermediate member is parallel to the top member and the base member.

12. The portable apparatus according to claim 1 further comprising a power cord that is electrically connected to the electrically conductive members and configured to be connected to a power source.

13. The portable apparatus according to claim 1 wherein the upper plate member has a plurality of openings, wherein each opening in the upper plate member is aligned with the interior region of a corresponding post member, and wherein the electrically conductive members in the interior region of each post member extend into the interior region of the wall structure.

14. The portable apparatus according to claim 13 further comprising an electrical power cord having a portion extending into the interior region of the wall structure and electrically connected to the electrically conductive members.

15. The portable apparatus according to claim 14 wherein the space extending about the wall structure has a size that allows the electrical power cord to be wrapped around the wall structure and remain within the space.

16. The portable apparatus according to claim 1 wherein each post member has a flat face portion which faces outward, and wherein the at least one electrical power receptacle is located in the face portion.

* * * * *